(12) United States Patent
Wang et al.

(10) Patent No.: US 10,735,329 B2
(45) Date of Patent: Aug. 4, 2020

(54) CONTAINER COMMUNICATION METHOD AND SYSTEM FOR PARALLEL APPLICATIONS

(71) Applicant: Huazhong University of Science and Technology, Wuhan, Hubei (CN)

(72) Inventors: Duoqiang Wang, Hubei (CN); Hai Jin, Hubei (CN); Chi Zhang, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 16/299,820

(22) Filed: Mar. 12, 2019

(65) Prior Publication Data

US 2019/0349305 A1    Nov. 14, 2019

(30) Foreign Application Priority Data

May 11, 2018   (CN) .......................... 2018 1 0453062

(51) Int. Cl.
*G06F 9/54*    (2006.01)
*H04L 12/801*   (2013.01)
*H04L 9/12*    (2006.01)
*H04L 9/14*    (2006.01)

(52) U.S. Cl.
CPC ............ *H04L 47/193* (2013.01); *G06F 9/544* (2013.01); *H04L 9/12* (2013.01); *H04L 9/14* (2013.01)

(58) Field of Classification Search
CPC combination set(s) only.
See application file for complete search history.

(56) References Cited

U.S. PATENT DOCUMENTS

| | | | |
|---|---|---|---|
| 2005/0013255 A1* | 1/2005 | Knop et al. | |
| 2006/0215839 A1* | 9/2006 | Augenstein et al. | |
| 2007/0025374 A1* | 1/2007 | Stefan et al. | |
| 2009/0252219 A1* | 10/2009 | Chen et al. | |
| 2017/0300394 A1* | 10/2017 | Raut | |
| 2019/0140980 A1* | 5/2019 | Yamashima et al. | |

FOREIGN PATENT DOCUMENTS

CN  PCT/CN2016/107228    *  6/2017

* cited by examiner

*Primary Examiner* — Andrew Lai
*Assistant Examiner* — Mohammed M Murshid
(74) *Attorney, Agent, or Firm* — Michael X. Ye; Morris, Manning & Martin, LLP

(57) ABSTRACT

A container communication method for parallel-applications and a system using the method are disclosed. The method includes: when a first process of a first container has to communicate with a second process of a second container and the first and second containers are in the same host machine, creating a second channel that is different from a TCP (Transmission Control Protocol)-based first channel; the first container sending communication data to a shared memory area assigned to the first container and/or the second container by the host machine and send metadata of the communication data to the second container through the first channel; and when the second process acknowledges receiving the communication data based on the received metadata, transmitting the communication data to the second container through the second channel and feeding acknowledgement of the data back to the first process through the first channel.

5 Claims, 4 Drawing Sheets

CONTAINER COMMUNICATION METHOD AND SYSTEM FOR PARALLEL APPLICATIONS

FIELD

The present invention relates to data communication, and more particularly to a container communication method and system for parallel-applications.

DESCRIPTION OF THE RELATED ART

With the rapid development of microprocessors, the computing capacity of processors have been increasing at a speed as described by the "Moore's law" in the last decade. While a modern server is much more capable of processing than an old one was, the demands for computation from application programs have not been increasing at the same pace, making surplus of processing capability a redundancy in the existing computers. For improving the utilization of processing resources in computers, virtualization has been proposed as a solution. Through running multiple virtual machines in the same physical machine, the processing capability and resource utilization of servers can be significantly improved, and advantageous online migration, dynamic deployment, and load balancing can be achieved.

The continuous evolution of technologies makes scientific research organizations and businesses have increasing demands for high-performance computation. However, since the computation resources required by high-performance computation vary from organization to organization, the exact demands for computation resources cannot be determined without a specific scenario of high-performance computation. Even in a given scenario, different scenes may have very different computation demands. All of these prevent the high-performance clusters built by scientific research organizations from fully satisfying demands for resources of their users. In addition, there are cases where organizations only need high-performance computation resources for a limited period of time, and it is uneconomical for these organizations to build their own high-performance computation clusters in terms of the high costs and long lead time. For the above two typical issues, high-performance computation virtual servers or virtual instances provided by cloud computation service providers can well address the issues about temporary shortage of resources as well as high cost and long lead time required by building in-house clusters.

Nevertheless, for maximizing resource utilization, users running too many virtual machines on the physical machine, leading to serious overload that prevents timely respond to resource demands and in turn compromise computing capacity in high performance parallel-application scenarios.

As is known to all, typical high-performance parallel application systems are implemented based on MPIs (Message Passing Interfaces) programming models. In a traditional case with a physical machine, for optimizing process efficiency of multiple MPIs in the same host machine, an MPI library is used to provide two process information transmission channels, i.e., Shared Memory and Cross Memory Attach, so as to optimize the efficiency of message passing across different processes in the same host machine. However, in a case with cloud computation, communication among virtual machines running in the same host machine or among different MPI processes in the same container can be only achieved by means of Socket, that is, network communication, and fast communication among processes through the aforementioned channels such as Shared Memory and Cross Memory Attach that the MPI library provides is impossible. This significantly degrades information transmission in terms of speed and efficiency, which has adverse impacts on computation speed of high performance parallel-application.

To address the low efficiency of cross-process communication in a virtualized environment of high performance parallel-application containers, proposals to modify the MPI library so that it can detect adjacent containers in the same host machine have been made. Such a method allows communication among MPI processes of different container to be performed using a shared memory instead of network channel communication by default, thereby to certain degrees, improving computation efficiency of the high-performance parallel application systems. However, the known efficiency optimization approaches requires modification in not only the existing MPI deploy environment, but also the source codes of related MPI applications. Besides, it does not improve the communication efficiency for any high performance parallel application that is not based on MPI. In other words, the known method is only applicable to systems built using MPI programming models, and unable to make communication of other applications running in the containers such as transactional applications more efficient.

Some researchers suggest a shared-memory based communication method between containers. The known method provides a communication framework based on client-server models. In order to utilize this framework, container communication through a shared memory is only possible when source codes of the application have been modified and then translated based on the communication framework. Although this existing method improves communication efficiency in the same host machine to some extent, it is less compatible and less operable, and is not practical because it costs too much to modify the many existing codes.

Some other researchers provide a method of container communication using shared memory. The known method achieves message transmission and negotiation between containers through shared files in a network-based system. While the known method eventually performs data transmission among containers in the form of shared memory, the overall process is less efficient. This is because transmission of control messages for creating the shared memory area, copying data, and releasing shared memory is made through files, and both of the communicating containers have to open and read/write the files. The whole process requires at least twice switching between the user mode and the kernel mode, and may even involve application for memory space. Consequently, the known method does not significantly improve the efficiency of the overall communication system.

China Patent Publication No. CN105847108A discloses a method and an apparatus for communication between containers. The method comprises: a first virtual network bridge sends a first message to a second virtual network bridge apart from the first virtual network bridge in a sub network, wherein the first message includes address information of the first container and identifier information of the first virtual network bridge; the first virtual network bridge receives a second message sent by the second virtual network bridge, wherein the second message includes address information of a second container and identifier information of the second virtual network bridge; if the identifier information of the first virtual network bridge is identical with that of the second virtual network bridge, the first virtual network bridge sends the address information of the second container to the first container, so that the first container carries out communication with the second container according to the address information of the second container. According to the prior art, normal communication between containers that are distributed at different Docker servers and belong to the same user is realized. Besides, broadcasting of a to-be-sent message in a broadcasting mode is not needed during communication between containers, so that security of information interaction between containers is improved. However, the communication is less efficient.

SUMMARY OF THE INVENTION

In view of the shortcomings of the prior art, the present invention provides a container communication method for parallel-applications and a system using the method. The disclosed method and system optimize communication of high-performance parallel applications of all kinds between different containers in the same host machine in terms of efficiency, allowing communication among all the containers in the same host machine to be achieved using shared memory instead of socket communication. This maximizes the efficiency of communication between containers in the same host machine, reduces the time waiting for network I/O operations performed by the host processor, improves computation efficiency of high-performance parallel applications, and further enhances utilization of system resources, thereby better satisfying needs of computation and communication of parallel applications, and solving the problems about low efficiency and limited performance of parallel application communication in the prior art.

According to a preferred mode, the present invention discloses a container communication method for parallel-applications, the method comprises: when a first process of a first container has to communicate with a second process of a second container and the first and second containers are in the same host machine, the host machine creating a second channel that is different from a TCP (Transmission Control Protocol)-based first channel between the first container and the second container; the first container sending communication data of communication between the first process and the second process to a shared memory area assigned to the first container and/or the second container by the host machine and send metadata of the communication data to the second container through the first channel; and when the second process acknowledges receiving the communication data based on the received metadata, the first container transmitting the communication data to the second container through the second channel and the second process feeding acknowledgement of the data back to the first process through the first channel. The present invention uses the first channel for connection-oriented confirmation, and uses the second channel exclusively for data transmission, so as to prevent data tempering, to improve security, to minimize costs for internal communication, to enhance data transmission speed, and to eliminate conflicts during communication. First, communication via shared memories is much more stable than communication via TCPs. Second, transmitting data and metadata of the data through the same channel is considered insecure. Therefore, in the present the communication data the metadata thereof are sent through different channels, so as to ensure security. Besides, in the present invention, the metadata that are relatively small in data size are sent through the TCP-based first channel, thereby making data transmission more accurate and more reliable. On the other hand, the communication data that are relatively large in data size are transmitted by means of the shared memory that is more efficient, thereby ensuring efficient parallel-application communication.

According to a preferred mode, the method further comprises: determining locations where the first container and the second container are in, which comprises: when the first process has to communicate with the second process, the first process making attempts to establish communication with the second process by calling a socket programming interface of an operating system in the host machine, when the first process and the second process realize information transfer through the socket programming interface, acquiring a first IP address of the first container and a second IP address of the second container, and using the both together with a corresponding subnet mask to compute a first network ID of the first container and a second network ID of the second container; and when the first network ID and the second network ID are identical, confirming that the first container and the second container are in the same host machine. In this way, the present invention can locate the first container and the second container fast and accurately and calls for shared-memory communication as disclosed herein when the two containers are in the same host machine, thereby improving communication efficiency.

According to a preferred mode, the step of creating the second channel that is different from the TCP-based first channel comprises: after it is confirmed that the first container and the second container are in the same host machine, waiting until the first channel has been established between the first process and the second process based on TCP; and creating the second channel that allows data transmission according to a first semantic information connected to the TCP of the first channel. In this way, the present invention can create the second channel using the semantic context of the socket, without modifying source codes of the first process and the second process, thus having good compatibility and practicality.

According to a preferred mode, the method further comprises; determining whether there is further data exchange between the first process and the second process according to the acknowledgement of the received data; and if there is further data exchange between the first process and the second process, when it is confirmed that the first IP address of the first container and the second IP address of the second container remain unchanged, using the shared memory area, the established first channel, and the established second channel to complete the process communication between the first process and the second process in a way that subsequent communication data is transmitted through the second channel and metadata of the subsequent communication data is transmitted through the first channel; or if there is no further data exchange between the first process and the second process, negotiating for release of the second channel, and only releasing the first channel when the second channel has been released. In this way, the subsequent data communication can be made more efficiently. Besides, releasing the second channel first allows quick establishment of the second channel based on the first channel in the case that the second channel is being released or has been released while the first channel has not been released, but the first process and the second process need further communication, making communication more efficient.

According to a preferred mode, the step of the first container sending the communication data to the shared memory area assigned to the first container and/or the second container by the host machine comprises: identifying a status that the first process sends the communication data to a kernel through the socket programming interface, and then a driver interface copying the communication data from the kernel to the shared memory area. In this way, the need of modifying source codes of the first process can be eliminated, thereby ensuring good compatibility and practicality of the present invention.

According to a preferred mode, the step of transmitting the communication data to the second container through the second channel is achieved by calling the driver interface to copy the communication data to a process space of the second process. In this way, the need of modifying source codes of the second process can be eliminated, thereby ensuring good compatibility and practicality of the present invention.

According to a preferred mode, before the communication data is transmitted through the second channel, the second process transmits a symmetric key to the first process through the first channel that has been encrypted, and the first process first uses the symmetric key to encrypt the communication data and then transmits the communication data to the second container through the second channel. In this way, the present invention can have improved security with slightly increased computation costs.

According to a preferred mode, the symmetric key is generated using a randomized algorithm. In this way, the present invention can have further improved security.

According to a preferred mode, the present invention further discloses a container communication method for parallel-applications. The system comprises: at least one processor and at least one computer-readable storage medium, which are configured for: when a first process of a first container has to communicate with a second process of a second container and the first and second containers, are in the same host machine, the host machine creating a second channel that is different from a TCP-based first channel between the first container and the second container; the first container sending communication data of communication between the first process and the second process to a shared memory area assigned to the first container and/or the second container by the host machine and sending metadata of the communication data to the second container through the first channel; and when the second process acknowledges receiving the communication data based on the received metadata, the first container transmitting the communication data to the second container through the second channel and the second process feeding acknowledgement of the data back to the first process through the first channel.

According to a preferred mode, the at least one processor and at least one computer-readable storage medium are further configured for: determining locations where the first container and the second container are in, which comprises: when the first process has to communicate with the second process, the first process making attempts to establish communication with the second process by calling a socket programming interface of an operating system in the host machine, when the first process and the second process realize information transfer through the socket programming interface, acquiring a first IP address of the first container and a second IP address of the second container, and using the both together with a corresponding subnet mask to compute a first network ID of the first container and a second network ID of the second container; and when the first network ID and the second network ID are identical, confirming that the first container and the second container are in the same host machine.

DETAILED DESCRIPTIONS OF THE INVENTION

Figure 1:
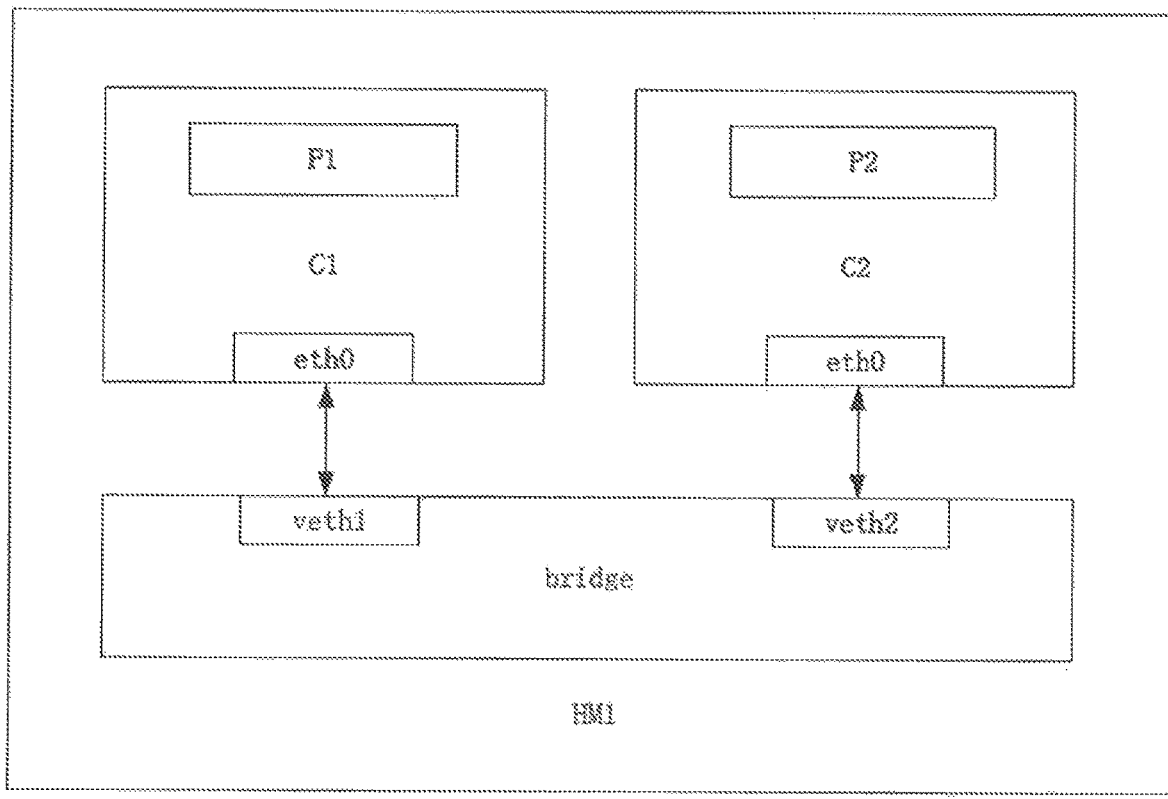
FIG. 1 is a conventional runtime environment where parallel applications are run simultaneously in one host machine.

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Parallel applications are software programs written using parallel frameworks and running in a single-machine multi-thread and/or multi-machine multi-process way. Preferably, a parallel framework may be a parallel framework such as multiple threads, shared memory or message transmission.

A container, similar to a virtual machine, is a software sandbox, and also a security mechanism. It provides a program that is running with an isolated environment and strictly controls access of a program in the container to resources. Linux Namespaces mechanism provides a solid basis for container-based virtualization. Container may use this capability to isolate resources so that processes in different containers belong to different Namespaces, and are transparent to and independent of each other. Containers are light-weight virtualization technology at the operating-system level, and its underlying technologies, Linux Namespace and Linux Control Group (Cgroup) are both entirely kernel properties, free from costs for any intermediate layer. This contributes to excellent resource utilization and performance comparable with those of physical machines. Preferably, in the present invention, the first container and/or the second container is, for example, a software sandbox having an isolated environment and being created in a host machine using operating-system-based virtualization technology.

Metadata, also known as intermediate data and relay data, is data about data, and mainly messages describing attributes of data, for supporting functions such as data location indicating, history data providing, resource locating, file recording and more.

Embodiment 1

The present embodiment discloses a container communication method for parallel-applications. Without causing conflicts or contradiction, the preferred modes for other embodiments may be incorporated into the present embodiment as supplement.

According to a preferred mode, referring to FIG. 1, the method may comprise: when a first process P1 in a first container C1 has to communicate with a second process P2 in a second container C2 and the first and second containers C1, C2 are in the same host machine HM1, creating a second channel that is different from a TCP (Transmission Control Protocol)-based first channel between the first container C1 and the second container C2; the first container C1 sending communication data of communication to a shared memory area assigned to the first container C1 by the host machine HM1 and send metadata of the communication data to the second container C2 through the first channel; and when the second process P2 acknowledges receiving the communication data based on the received metadata, transmitting the communication data to the second container C2 through the second channel and feeding acknowledgement of the data back to the first process P1 through the first channel; Preferably, the second channel may be based on a mature, existing communication protocol. People skilled in the art may make selection from existing communication protocols according to practical needs.

According to a preferred mode, the method may further comprise: before the first container C1 sends the communication data to the shared memory area, determining whether the first container C1 and the second container C2 are in a predetermined list of trustable containers, and when the first container C1 and the second container C2 are both in the predetermined list of trustable containers, activating communication authority for the first container C1 and the second container C2. Otherwise, the first container C1 and/or the second container C2 request communication authority form the user.

According to a preferred mode, the first channel uses a first encryption mechanism, and the second channel uses a second encryption mechanism that is different from the first encryption mechanism.

According to a preferred mode, the method may further comprise: the first container C1 assigning communication data with a security level according to an importance level of the communication data, and when the security level of the communication data excesses a predetermined security threshold, the second channel using a third encryption mechanism that is different from the second encryption mechanism, wherein the second encryption mechanism uses triple symmetric encryption, and the third encryption mechanism uses asymmetric encrypt. Preferably, the higher the importance level is, the higher the corresponding security level is.

According to an alternative mode, the method may further comprise: before the second channel uses the third encryption mechanism that is different from the second encryption mechanism, the host machine analyzing a first security state of a first runtime environment in the current operating system, and the second channel only using the third encryption mechanism when the first runtime environment shows abnormality. That is, when the first runtime environment is secure, the second channel remains using the second encryption mechanism.

According to an alternative mode, the method may further comprise: before the second channel uses the third encryption mechanism that is different from the second encryption mechanism, the host machine acquiring the first security state of the first runtime environment in the current operating system, a second security state of a second runtime environment contained by the first container C1, and a third security state of a third runtime environment contained by the second container C2, and the second channel only using the third encryption mechanism when at least one of the first runtime environment, the second runtime environment and the third runtime environment shows abnormality. That is, when the first runtime environment, the second runtime environment and the third runtime environment are all in a secure state, the second channel remains using the second encryption mechanism.

Preferably, before the communication data is transmitted through the second channel, the second process P2 transmits a symmetric key to the first process P1 through the encrypted first channel, and the first process P1 uses the symmetric key to encrypt the communication data before, sending it to the second container C2 through the second channel.

According to a preferred mode, the method may further comprise: determining locations of the first container C1 and the second container C2, which may comprise: when the first process P1 has to communicate with the second process P2, the first process P1 making attempts to establish communication with the second process P2 by calling a socket programming interface of an operating system; when the first process P1 and the second process P2 realize information transfer through the socket programming interface, acquiring a first IP address of the first container C1 and a second IP address of the second container C2, and using the both together with a corresponding subnet mask to compute a first network ID of the first container C1 and a second network ID of the second container C2, and when the first network ID and the second network ID are identical, confirming that the first container C1 and the second container C2 are in the same host machine HM1.

According to a preferred mode, the step of creating the second channel that is different from the TCP-based first channel comprises: after it is confirmed that the first container C1 and the second container C2 are in the same host machine HM1, waiting until the first channel has been established between the first process P1 and the second process P2 based on TCP; and creating the second channel that allows transmission of the communication data according to a first semantic information connected to the TCP of the first channel.

According to a preferred mode, the method may further comprise: determining whether there is further data exchange between the first process P1 and the second process P2 according to the acknowledgement of the received data; and if there is further data exchange between the first process P1 and the second process P2, when it is confirmed that the first IP address of the first container C1 and the second IP address of the second container C2 remain unchanged, using the shared memory area, the established first channel, and the established second channel to complete the data communication between the first process P1 and the second process P2 in a way that subsequent communication data are transmitted through the second channel and metadata of the subsequent communication data are transmitted through the first channel; or if there is no further data exchange between the first process P1 and the second process P2, negotiating for release of the second channel, and only releasing the first channel when the second channel has been released.

Embodiment 2

According to a preferred mode, the present invention discloses a container communication method for parallel-applications, and the system is suitable for executing the steps of the method of the present invention so as to achieve the expected technical effects.

The present embodiment may be further improvement and/or supplement to Embodiment 1, and the repeated description is omitted herein. Without causing conflicts or contradiction, the preferred modes for other embodiments may be incorporated into the present embodiment as supplement.

According to a preferred mode, the system may comprise: at least one processor and at least one computer-readable storage medium storing several commands that may include at least one command performing the following operations when executed by the at least one processor: when a first process P1 of a first container C1 has to communicate with a second process P2 of a second container C2 and the first and second containers C1, C2 are in the same host machine HM1, the host machine HM1 creating a second channel that is different from a TCP (Transmission Control Protocol)-based first channel between the first container C1 and the second container C2; the first container C1 sending communication data of communication between the first process P1 and the second process P2 to a shared memory area assigned to the first container C1 and/or the second container C2 by the host machine HM1 and send metadata of the communication data to the second container C2 through the first channel; and when the second process P2 acknowledges receiving the communication data based on the received metadata, the first container C1 transmitting the communication data to the second container C2 through the second channel and the second process P2 feeding acknowledgement of the data back to the first process P1 through the first channel.

According to a preferred mode, several commands may further include at least one command performing the following operations when executed by the at least one processor: determining locations of the first container C1 and the second container C2, which comprises: when the first process P1 has to communicate with the second process P2, the first process P1 making attempts to establish communication with the second process P2 by calling a socket programming interface of an operating system; when the first process P1 and the second process P2 realize information transfer through the socket programming interface, acquiring a first IP address of the first container C1 and a second IP address of the second container C2, and using the both together with a corresponding subnet mask to compute a first network ID of the first container C1 and a second network ID of the second container C2; When the first network ID and the second network ID are identical, confirming that the first container C1 and the second container C2 are in the same host machine HM1.

According to a preferred mode, the step of creating the second channel that is different from the TCP-based first channel comprises: after it is confirmed that the first container C1 and the second container C2 are in the same host machine HM1, waiting until the first channel has been established between the first process P1 and the second process P2 based on TCP; and creating the second channel that allows data transmission according to the semantic information on the first channel.

According to a preferred mode, the computer program command and/or several commands may further include at least one command performing the following operations when executed by the at least one processor: determining whether there is further data exchange between the first process P1 and the second process P2 according to the acknowledgement of the received data; and if there is further data exchange between the first process P1 and the second process P2, when it is confirmed that the first IP address of the first container C1 and the second IP address of the second container C2 remain unchanged, using the shared memory area, the established first channel, and the established second channel to complete the data communication between the first process P1 and the second process P2 in a way that subsequent communication data are transmitted through the second channel and metadata are transmitted through the first channel; or if there is no further data exchange between the first process P1 and the second process P2, negotiating for release of the second channel, and only releasing the first channel. When the second channel has been released.

According to a preferred mode, the step of the first container C1 sending the communication data to the shared memory area assigned to the first container C1 and/or the second container C2 by the host machine HM1 comprises: identifying a status that the first process P1 sends the communication data to a kernel through the socket programming interface, and then a driver interface copying the communication data from the kernel to the shared memory area.

According to a preferred mode, the step of transmitting the communication data to the second container C2 through the second channel is achieved by calling the driver interface to copy the communication data to a process space of the second process P2.

According to a preferred mode, the computer program command and/or several commands may further include at least one command performing the following operations when executed by the at least one processor: before the communication data are transmitted through the second channel, the second process P2 transmits a symmetric key to the first process P1 through the first channel that has been encrypted, and the first process P1 first uses the symmetric key to encrypt the communication data and then transmits the communication data to the second container C2 through the second channel.

According to a preferred mode, for any of the modes of the disclosed method referred to in the present invention, the computer program command and/or the several commands may include at least one command that, when executed by the at least one processor, performs operations corresponding to the method.

According to a preferred mode, for any of the modes of the disclosed method referred to in the present invention, both of the at least one processor and the at least one computer-readable storage medium may be configured to perform operations corresponding thereto.

Embodiment 3

The present embodiment is further improvement based on Embodiment 1, 2 or a combination thereof, and the repeated description is omitted herein. Without causing conflicts or contradiction, the preferred modes for other embodiments may be incorporated into the present embodiment as supplement.

According to a preferred mode, the present embodiment discloses a container communication method for parallel-applications.

Preferably, the method may comprise: in a container cluster in which parallel applications are run, when a first process P1 corresponding to a first application in a first container C1 needs to communicate with a second process P2 corresponding to a second application in a second container C2, the first process P1 may attempt to establish communication with the second process P2 by calling the socket programming interface of the operating system. Preferably, the operating system referred to in the present invention may be at least one of UNIX, XENIX, LINUX, Windows, Netware and Mac. Preferably, for example, where the operating system is Linux, the first container and/or the second container may be created using at least one of the Docker technology, the Singularity technology and the LXC technology, LXC refers to Linux Container.

Figure 2:
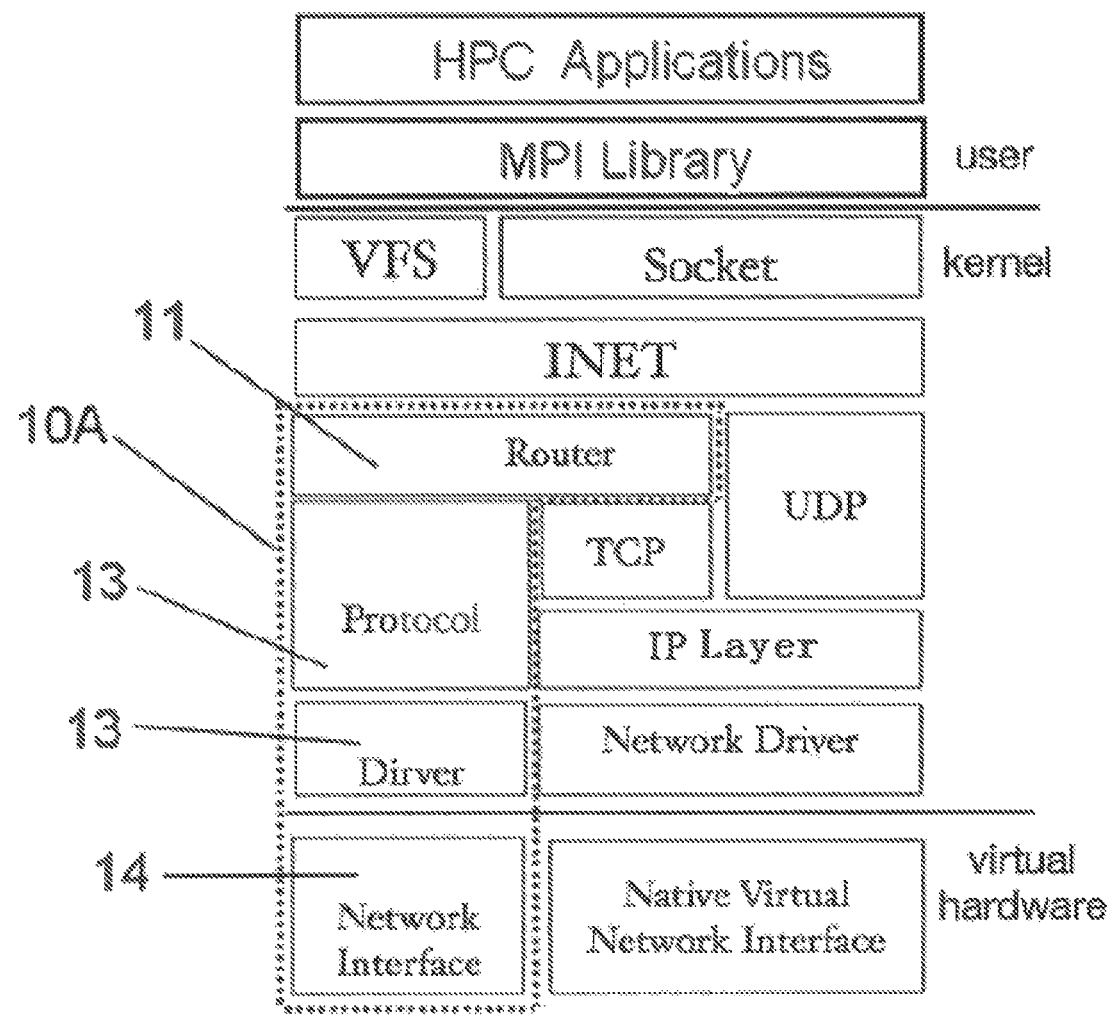
FIG. 2 schematically shows the architecture of the system of an alternative mode of the present invention.

According to an alternative mode, referring to FIG. 2, the disclosed method may be realized using a kernel extension module loaded into the system kernel. The kernel extension module may comprise a router module 11, a protocol module 12 and a driver module 13. For example, the kernel extension module is loaded into the system kernel of the operating system in each host machine. When communication between the first container and the second container is required, the router module 11 acquires the first IP address of the first container and the second IP address of the second container, and when the kernel extension module determines that the first container and the second container are both in the host machine according to the first IP address and the second IP address, the router module 11 establishes a second channel for transmission of communication data according to the semantic information connected to the TCP (Transmission Control Protocol). The first process sends the communication data to the kernel through socket programming interface. Then the router module 11 copies the user data to a shared memory area accessible to both the first process and the second process, and sends the metadata corresponding to the communication data to the second process through the TCP connection. When the second process acknowledges receiving the communication data according to the metadata, the router module 11 copies the communication data from the specified memory address in the metadata to a process space of the second process through the second channel. Preferably, the second channel is established according to the protocol module 12. Preferably, both of the first container and the second container are run in the system kernel loaded with the kernel extension module.

Figure 3:
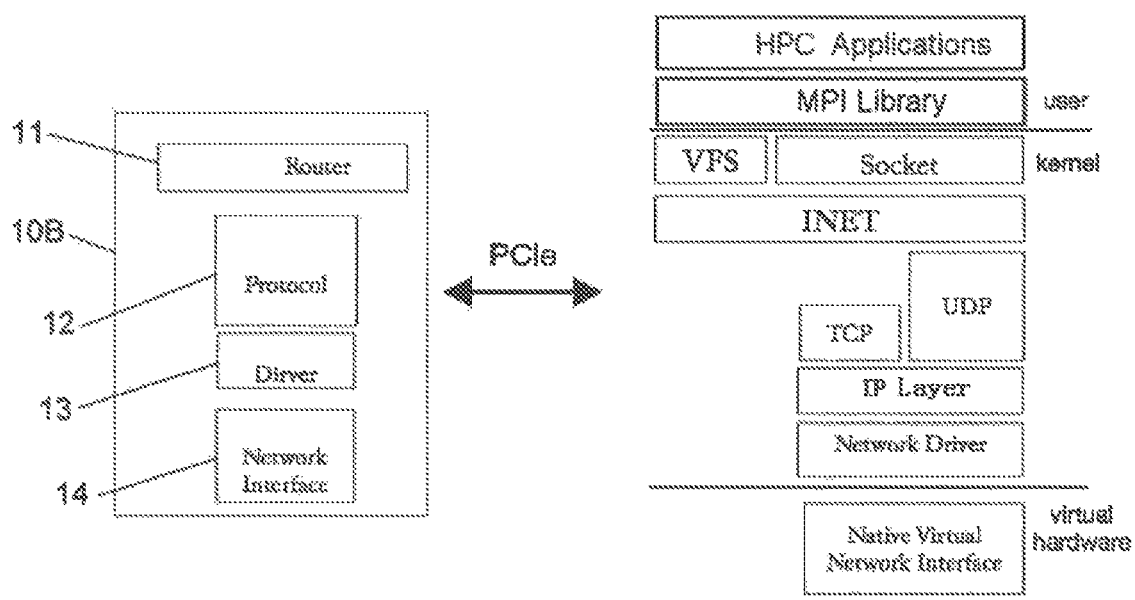
FIG. 3 schematically shows the architecture of the system of another alternative mode of the present invention.

According to another alternative mode, referring to FIG. 3, the disclosed method may be realized using a PCI (Peripheral Component Interconnect) expansion card 10B. Preferably, the method may comprise: using at least one external PCI expansion card 10B. The PCI expansion card 10B is connected to the host machine through a PCI slot of the host machine. Therein, the PCI expansion card 10B may comprise a router module 11, a protocol module 12, and a driver module 13. Preferably, the router module 11, the protocol module 12, and the driver module 13 may each be an application-specific integrated circuit (ASIC), FPGA (Field Programmable Gate Array), or another hardware equivalent. Preferably, both of the first container and the second container are run in system kernels connected to the PCI expansion card 10B.

Preferably, the method may further comprise: when the first process P1 and the second process P2 establish communication through the socket programming interface, the router module 11 in the host machine HM1 in which the first container C1 is located acquiring a first IP address of the first process P1 and a second IP address of the second process 12.

Preferably, the method may further comprise: the host machine determining the locations of the first container C1 and the second container C2 according to the first IP address and the second IP address, and where the first container C1 and the second container C2 are both in the host machine HM1, the router module 11 acting as a shared memory to help the first process P1 and the second process P2 with communication data transmission.

According to a preferred mode, when the router module 11 acts as a shared memory to help the first process P1 and the second process P2 with communication data transmission, the protocol module 12 establishes a second channel for transmitting communication data according to the semantic information connected to the TCP.

According to a preferred mode, when the first process P1 sends the communication data to the kernel through the socket programming interface, the router module 11 copies the communication data to the created memory area, and sends metadata corresponding to the communication data to the second process P2 through the TCP connection. In this way, the present invention separately transmits the communication data and its metadata, wherein only the data itself is transmitted through the shared memory and the metadata of the data is transmitted through the TCP connection, thereby ensuring stability of the transmission and improving security of the transmission.

According to a preferred mode, when receiving the metadata, the second process P2 informs the router module 11 to copy the communication data from the specified memory address in the metadata to the process space of the second process P2, and send acknowledgement message of the data through the TCP connection.

Embodiment 4

The present embodiment is further improvement based on Embodiment 1, 2, 3 or a combination thereof, and the repeated description is omitted herein. Without causing conflicts or contradiction, the preferred modes for other embodiments may be incorporated into the present embodiment as supplement.

According to a preferred mode, the present invention discloses a container communication system for parallel-applications. The system may comprise at least one processor and at least one computer-readable, storage medium storing a computer program command. The computer program command comprises commands performing the following operations when executed by the at least one processor: calling the PCI expansion card 10B through the PCI slot, and when in a container cluster in which parallel applications are run, and a first process of a first container needs to communicate with a second process of a second container, the first process making attempts to establish communication with the second process by calling a socket programming interface of an operating system it is located in; and when message transmission between the first process and the second process is established through the socket programming interface, the router module 11 of the PCI expansion card 10B acquiring the first IP address of the first process and the second IP address of the second process; and then determining whether the first container and the second container are both in the host machine according to the first IP address and the second IP address, and if the first container and the second container are both in the host machine, the router module 11 helping with data transmission between the first process and the second process in the form of shared memory, or if the first container and the second container are not in the host machine, achieving data transmission between the first process and the second process through a predetermined virtual network bridge. All the existing application programs capable of TCP-based communication may be accelerated using the method of the present invention without any modification, making the present invention more practical and operable, and more desirable and acceptable to developers. When the containers run non high-performance parallel applications, the PCI expansion card 10B can detect communication between containers in the same host machine, and turn to use the memory communication provided by the PCI expansion card 10B, thereby maximizing efficiency of cross-process communication. Thus, the present invention can not only optimize communication efficiency among high-performance parallel applications in different containers in the same host machine, but also optimize communication efficiency of normal applications, such as Web services, database services and so on.

According to a preferred mode, when the first process sends the user data to the kernel through the socket programming interface, the router module 11 may copy the user data to the applied memory area, and send the metadata corresponding to the user data to the second process through the TCP connection. The present invention allows data transmission through a combination of a TCP-connection-based first channel and a non-TCP-connection-based second channel, other than replacing the TCP connection directly. Thus, the method of the present invention has improved compatibility, making it compatible to most existing programs. In addition, the present invention using TCP connection for transmission of data control messages improves reliability of message transmission to some extent, and ensures validity throughout data transmission. For these reasons, the present invention is more stable and reliable than the existing methods.

According to a preferred mode, when the second process receives the metadata, the router module 11 copies the user data from the specified memory address in the metadata to the process space of the user, and sends an acknowledgement message through the TCP connection.

Embodiment 5

The present embodiment is further improvement based on Embodiment 1, 2, 3, 4 or a combination thereof, and the repeated description is omitted herein. Without causing conflicts or contradiction, the preferred modes for other embodiments may be incorporated into the present embodiment as supplement.

Preferably, the present embodiment discloses a container communication method for parallel-applications.

Figure 4:
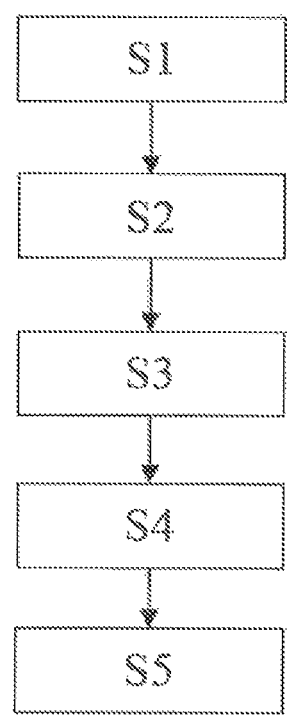
FIG. 4 is a flowchart of the method of a preferred mode of the present invention.

According to a preferred mode, referring to FIG. 4, the method may comprise at least one of the following steps: Step S1: for a container cluster in which parallel applications are run, when a local process therein needs to communicate with another target process, the local process making attempts to establish communication by calling a socket programming interface of a Linux operating system; Step S2: when message transmission between the local process and the target process is performed through a socket communication channel, the router module 11 acquiring the IP address of the local process connected to the socket and the IP address of the target process, and accordingly determining the location of the container where the target process is, and if the containers of the local process and the target process are in the same host machine, the PCI expansion card 10B performing data transmission in the form of shared memory;

Step S3: during data transmission by means of shared memory, the protocol module 12 establishing a second channel according to the semantic information connected to the TCP, and the second channel is mainly used for transmission of user data; Step S4: when the local process sends the user data to the kernel through the socket interface, the PCI expansion card 10B copying the data to the applied memory area, and sending the metadata to the target process through the TCP connection; Step S5: when the target process receives the metadata through the TCP connection, the PCI expansion card 10B copying the user data from the specified memory address in the metadata to the process space in which the target process is located, and sending acknowledgement message through the TCP connection.

According to a preferred mode, Step S1 may comprise at least one of the following sub-steps: for every container in which high-performance parallel applications (hereinafter referred to as HPPAs) are run, the applications being run in the Linux kernel loaded with the PCI expansion card 10B, wherein each of the high-performance parallel applications is preferably written based on the MPI (Message Passing Interface); and when the process of one HPPA in a container needs to communicate with the process in another container, the processes of the HPPAs in different containers communicating through the socket and the processes of the local HPPAs creating the socket connection by calling the socket API (Application Programming Interface). Each container has a dedicated network Namespace and the TCP (Transmission Control Protocol)/IP (Internet Protocol) network protocol stacks which are separated with each other.

According to a preferred mode, Step S2 may comprise at least one of the following sub-steps: when the processes of the local HPPAs try to create the socket connection for data transmission, the router module 11 at least acquiring the IP address of the local process, the IP address of the target process and the port information, and determining whether the containers in which the two processes are located are in the same host machine by analyzing the IP address of the local process and the IP address of the target process, wherein the host machine is preferably a physical machine and/or a virtual machine; and if the container having the target HPC (High Performance Computing) process and processes running in containers hosted in the same host machine, the router module 11 transmitting the MPI message through the second channel.

According to a preferred mode, Step S3 may comprise at least one of the following sub-steps: when it is determined that the shared memory communication provided by the PCI expansion card 10B is to be used, the router module 11 first waiting for establishment of the TCP connection between the local process and the target process; when the router module 11 detects that the TCP connection between the local process and the target process has been established, the router module 11 calling the relevant interface of the protocol module 12 to create a second channel, which will be used for the actual data transmission; and after the local process sends the data through the relevant socket interface, the PCI expansion card 10B detecting whether a second channel of the IP address of the target process exists according to the IP address of the target process, and if a second channel of the IP address of the target process exists, sending the user data through the second channel, when a second channel of the IP address of the target process does not exist, a corresponding second channel will be created; and the driver module 13 in which the target container is located applying for a memory area accessible to both the container having the local process and the container having the target process, copying the data of the local process to the memory area, and sending the metadata to the target process through the TCP connection, wherein the metadata preferably comprises the location of the data and the size of the data.

According to a preferred mode, Step S4 may comprise at least one of the following sub-steps: the target process receiving the metadata from the local process through the TCP connection; when the router module 11 of the host machine in which the target process is located detects a source IP address message of a data packet, and finds that the IP address of the data packet and the target process IP are in the same host machine, the router module 11 extracting the metadata in the TCP connection and submitting it to the protocol module 12 of the PCI expansion card 10B of the host machine; the protocol module 12 at least ascertaining the address of the memory space in which the data is located, the size of the data and the type of the data according to semantic information obtained by analyzing the metadata received through the TCP connection; the protocol module 12 calling the driver interface according to the metadata so as to copy the corresponding data to the data space of the user program; and after the copying is completed, sending acknowledgement message to the local process through the TCP connection.

According to a preferred mode, Step S5 may comprise the following sub-steps: after the TCP connection of the local process receives the acknowledgement message form the target process, the router module 11 acquiring the IP address message of the target process; and when the IP address of the target process and the IP address of the local process are in the same host machine, detecting the acknowledgement message, and determining whether there is further data exchange, and if there is further data exchange, repeating steps S2 through S4 for data transmission of the next round, and if there is no further data exchange, negotiating to release the second channel, and after the second channel is released, the TCP connection is released as well.

Embodiment 6

The present embodiment is further improvement based on Embodiment 1, 2, 4, 5 or a combination thereof, and the repeated description is omitted herein. Without causing conflicts or contradiction, the preferred modes for other embodiments may be incorporated into the present embodiment as supplement.

According to a preferred mode, the present embodiment discloses a container communication system for high-performance parallel applications.

According to a preferred mode, the system may comprise a PCI expansion card 10B, the PCI expansion card 10B may comprise the following sub-modules: a router module 11 primarily used for determining a message about the relative position between the container in which the source process is located and the container in which the target process is located; a protocol module 12, which when it is determined that the source process and the target process are in the same host machine, creates a protocol semantics for establishing the second channel according to semantics of the actual TCP connection, wherein the protocol semantics is to be called by the relevant interfaces; a driver module 13 providing interfaces to the protocol module 12, specifically for establishment, release, data transmission and acknowledgement of the second channel; and a network interface 14. Preferably, the network interface 14 may be a virtual network interface, for receiving and sending network data packets.

According to a preferred mode, the router module 11 may comprise: a routing table, which primarily records messages about the IP addresses of the source process and the target process and the localization message to facilitate subsequent selection of the communication method, and is maintained by a route determining module; and/or the route determining module which is one of the key modules of the system and serves to maintain the routing table. When the source process communicates with the target process and attempts to establish the TCP connection, the router module 11 acquire the corresponding messages about the source IP address and the target IP address, and checks whether these messages exist in the routing table. If there is no address record from the source IP to the target IP or from the target IP to the source IP address, the route determining module determines whether the two IP addresses are in the same host machine according to the IP addresses and a subnet mask message. If the two are in the same host machine, the record is added into the routing table. If the two are not in the same host machine, the default operation is not to take any action, After every addition of a record in the routing table, cleaning of invalid route records is performed.

According to a preferred mode, the protocol module 12 may comprise: a semantic analysis module which creates and releases the second channel and transmits and receives data according to the state message of the TCP connection; and/or a data structure module which provides the basic data structure related to the second channel.

According to a preferred mode, the driver module 13 may comprise: a data transmission sub-module which provides interfaces for data transmission in the protocol module 12 so as to allow data copying, data acquiring, data transmission and so on; and/or a memory management sub-module which manages interface calling application, release, management of the shared memory area between containers. Preferably, the semantic analysis module, the route determining module, the data structure module and the memory management sub-module may each be an application-specific integrated circuit (ASIC), an FPGA, a general-purpose computer or any other hardware equivalents.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A container communication method for parallel-applications, wherein a host machine comprises a first process of a first container and a second process of a second container, the first container and the second container connected by a transmission control protocol (TCP)-based first channel, the method comprising:

creating a second channel between the first container and the second container, the second channel being different than the TCP-based first channel;

confirming that the first container and the second container are both in a predetermined list of trustable containers;

the first container sending through the first channel:

communication data between the first process and the second process to a shared memory area assigned to at least one of the first container and the second container by the host machine;

and metadata of the communication data to the second container;

the second process sending, an acknowledgement to the first container of receipt of the communication data based on the received metadata;

after receipt of the acknowledgment from the second process, the first container transmitting the communication data to the second container through the second channel;

the second process sending another acknowledgement of receipt of the communication data back to the first process through the first channel, determining locations of each of the first container and the second container, which comprises:

the first process establishing communication with the second process through a socket programming interface of an operating system, transferring information between the first process and the second process through the socket programming interface;

acquiring a first IF address of the first container and a second IP address of the second container after the first process and the second process transfer information;

using the first IP address of the first container and the second W address of the second container together with a corresponding subnet mask to compute a first network ID of the first container and a second network ID of the second container;

when the first network ID and the second network ID are identical, confirming that the first container and the second container are in the same host machine;

determining whether there is further data to exchange between the first process and the second process according to the acknowledgement of the received data; and if there is further data to exchange between the first process and the second process and after confirming that the first IF address of the first container and the second IP address of the second container remain unchanged, using the shared memory area, the established first channel, and the established second channel to complete the data communication between the first process and the second process in a way that subsequent communication data is transmitted through the second channel and metadata of the subsequent communication data is transmitted through the first channel;

if there is no further data to exchange between the first process and the second process, negotiating for a release of the second channel, and only releasing the first channel when the second channel has been released;

before the communication data is transmitted through the second channel, the second process transmitting a symmetric key to the first process through the first channel that has been encrypted; and the first process first using the symmetric key to encrypt the communication data and then transmitting the communication data to the second container through the second channel; and wherein the step of the first container sending the communication data to the shared memory area assigned to at least one of the first container and the second container by the host machine comprises:

the first process sending the communication data to a kernel through the socket programming interface; and a driver interface copying the communication data from the kernel to the shared memory area.

2. The method of claim 1, wherein the step of creating the second channel that is different from the TCP-based first channel comprises:

after confirming that the first container and the second container are in the same host machine, waiting until the first channel is established between the first process and the second process based on the TCP; and creating the second channel that allows transmission of the communication data according to a first semantic information connected to the TCP of the first channel.

3. The method of claim 1, wherein the symmetric key is generated using a randomized algorithm.

4. The method of claim 1, wherein the step of transmitting the communication data to the second container through the second channel is achieved by calling the driver interface to copy the communication data to a process space of the second process.

5. A container communication system for parallel-applications, the system comprising: at least one processor and at least one computer-readable non-transitory storage medium, which are configured such that:
  a first process of a first container communicates with a second process of a second container, wherein the first and second containers are in the same host machine and the first and second containers communicate through a transmission control protocol (TCP)-based first channel;
  confirming that the first container and the second container are both in a predetermined list of trustable containers;
  the host machine creating a second channel between the first container and the second container that is different from the TCP-based first channel;
  the first container sending through the first channel:
    communication data of communication between the first process and the second process to a shared memory area assigned to at least one of the first container and the second container by the host machine; and
    metadata of the communication data to the second container; and
  the second process sending an acknowledgement to the first container of receipt of the communication data based on the received metadata;
  after receipt of the acknowledgement from the second process, the first container sending data to the second container through the second channel; and
  the second process sending another acknowledgement of receipt of the communications data back to the first process through the first channel; and
  wherein the at least one processor and the at least one computer-readable storage medium are further configured such that locations of each of the first container and the second container are determine by:
    the first process establishing communication with the second process by calling a socket programming interface of an operating system;
    transferring information between the first process and the second process through the socket programming interface;
    acquiring a first IP address of the first container and a second IP address of the second container;
    using the first IP address of the first container and the second IP address of the second container together with a corresponding subnet mask to compute a first network ID of the first container and a second network ID of the second container;
    when the first network ID and the second network ID are identical, confirming that the first container and the second container are in the same host machine;
    determining whether there is further data to exchange between the first process and the second process according to the acknowledgement of the received data; and
    if there is further data to exchange between the first process and the second process and after confirming that the first IP address of the first container and the second IP address of the second container remain unchanged, using the shared memory area, the established first channel, and the established second channel to complete the data communication between the first process and the second process in a way that subsequent communication data is transmitted through the second channel and metadata of the subsequent communication data is transmitted through the first channel;
    if there is no further data to exchange between the first process and the second process, negotiating for a release of the second channel, and only releasing the first channel when the second channel has been released;
    before the communication data is transmitted through the second channel, the second process transmitting a symmetric key to the first process through the first channel that has been encrypted; and
    the first process first using the symmetric key to encrypt the communication data and then transmitting the communication data to the second container through the second channel; and
  wherein the first container sending the communication data to the shared memory area assigned to at least one of the first container and the second container by the host machine comprises:
    the first process sending the communication data to a kernel through the socket programming interface; and
    a driver interface copying the communication data from the kernel to the shared memory area.

\* \* \* \* \*